Patented Apr. 7, 1931

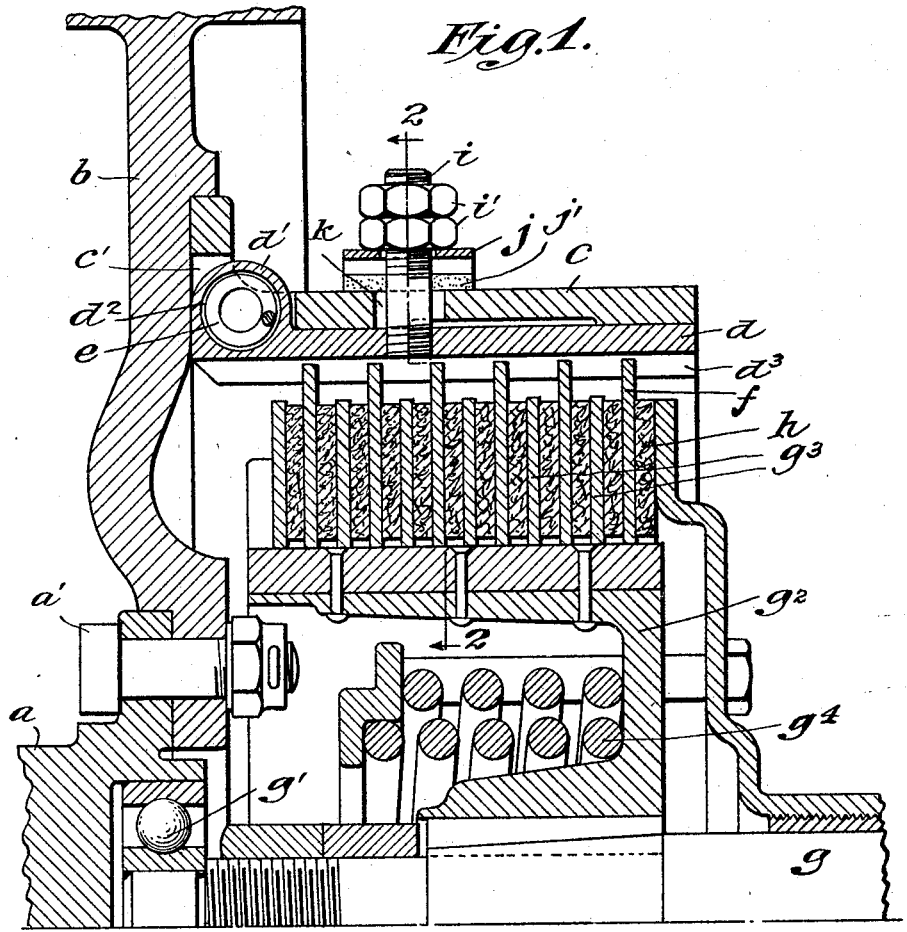
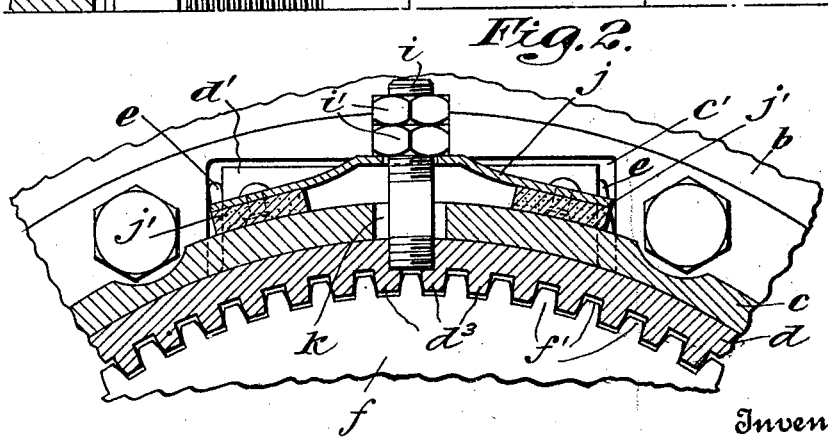

1,799,630

UNITED STATES PATENT OFFICE

PHILIP E. MATTHEWS, OF PLAINFIELD, NEW JERSEY, ASSIGNOR TO INTERNATIONAL MOTOR COMPANY, OF NEW YORK, N. Y., A CORPORATION OF DELAWARE

FRICTIONAL VIBRATION DAMPER

Application filed December 30, 1929. Serial No. 417,357.

The present invention relates to vibration dampening means for rotatable elements and members, more specifically, an improved torsional vibration damper adapted particularly for multiple disc clutches.

As is commonly known, considerable vibration is set up in rotatable elements, particularly the crank shaft, etc. of motor vehicles, such vibration resulting from variations in torsional stresses upon the shafts. The undesirable engine vibrations are now commonly damped by means of various forms of dampers, these being separate elements interposed between shaft sections or mounted directly on said sections.

The present invention relates more particularly to a vibration dampening means which is incorporated directly in the usual clutch construction of motor vehicles, the elements of the present invention being embodied in the usual clutch constructions now in service. In connection with this structure, it is proposed to combine the dampening effect of a resilient connection between relatively rotatable members with a light effect produced by frictional means carried by one member and engaging the other for resisting such relative movement. It has been found that the dampening of the objectionable vibrations in the crank shaft and related elements of a motor vehicle is accomplished far more effectively by a construction of the above character than the result obtained by merely interposing a resilient connection between rotatable elements of the driving mechanism of a motor vehicle.

An object of the invention, accordingly, is to provide a vibration dampening means which is highly effective in dampening out the undesirable engine vibrations noted above.

A further object of the invention is to provide a dampening means of the above character which is readily applied to existing forms of clutch constructions, the resulting structure being readily applied and inspected during service.

A further object of the invention is to incorporate in a clutch construction, friction dampening means between relatively rotatable members.

A further object of the invention is to provide an improved clutch construction in which one of the rotatable elements thereof is provided with a vibration dampening means comprising relatively rotatable elements between which a resilient connection is provided as well as a frictional connection.

Further objects, not specifically enumerated above, will be apparent as the invention is described in greater detail in connection with the accompanying drawings, wherein:

Figure 1 is a view in transverse section, taken through the axis of a clutch constructed in accordance with the present invention.

Figure 2 is a view in section, taken on line 2—2 of Figure 1 and looking in the direction of the arrows.

Referring to the above drawings, $a$ designates a driving member, such as the crank shaft of an engine, upon which a fly-wheel $b$ is mounted by means of bolts $a'$. This fly-wheel carries a cylindrical member $c$ which preferably forms a clutch housing and within which a concentric sleeve $d$ is mounted.

Suitable recesses $c'$ are formed in the housing $c$ and receive lugs $d'$ within which recesses $d^2$ are formed. Springs $e$ are seated within the recesses and yieldingly engage the side walls of the recesses $c'$, thus yieldingly opposing relative movement of the sleeve $d$ with respect to the housing $c$.

Spaced ribs $d^3$ are formed within the sleeve $d$ and are engaged by similarly formed ribs $f'$ upon friction plates $f$.

A driven shaft $g$, journaled at $g'$ in the driving shaft $a$, carries a spider $g^2$ upon which discs $g^3$ are keyed. Friction discs $h$ are mounted between the discs $g^3$ and $f$ in the usual manner and a spring $g^4$ may be utilized to cause the plates and discs to be normally engaged or disengaged. The specific engaging mechanism forms no part of the present invention and further description thereof is believed unnecessary herein.

Spaced about the periphery of sleeve $d$ are studs $i$. These studs are threaded and receive nuts $i'$ against which leaf springs $j$ are seated. The studs $i$ extend through clearances $k$ in the housing $c$ and thus permit a degree of movement of the sleeve with respect to the housing. At the extremities of the spring $j$, friction pads $j'$ are mounted, these pads engaging the periphery of the housing $c$ to resist relative movement between such housing and the sleeve $d$. The force of the spring $j$ upon the pads $j'$ may be varied by adjusting the nuts $i'$ as will be quite apparent.

From the foregoing, it will be seen that the friction pads $j'$ produce a dampening friction between the members $c$ and $d$, thus dampening the undesirable engine vibrations transmitted to the housing $c$ and preventing their transmission to the damper elements. While the invention has been described with specific reference to the accompanying drawings, it is not to be limited, save as defined in the appended claims.

What I claim is:

1. A device of the character described comprising relatively rotatable members, resilient means to resist relative rotation between the members, a radial stud carried by one of the members, a resilient element on the stud, friction means on the resilient element engaging the other member and means to adjust the resilient means radially.

2. A device of the character described comprising relatively rotatable members, a resilient means to resist relative rotation between the members, a stud carried by one of the members, a clearance in the other member through which the stud extends, a resilient element on the stud, and friction means on the resilient element engaging the other member.

3. A device of the character described comprising relatively rotatable concentric members, resilient means to resist relative rotation between the members, one of the members being formed with clearances, studs on the other member extending through the clearances, resilient strips on the studs, and friction pads on the strips engaging the other member.

4. A device of the character described comprising relatively rotatable concentric members, resilient means to resist relative rotation between the members, one of the members being formed with clearances, studs on the other members extending through the clearances, resilient strips on the studs, friction pads on the strips engaging the other member, and means to adjust the tension of the resilient strips.

This specification signed this 23rd day of December A. D. 1929.

PHILIP E. MATTHEWS.